Figure 3:
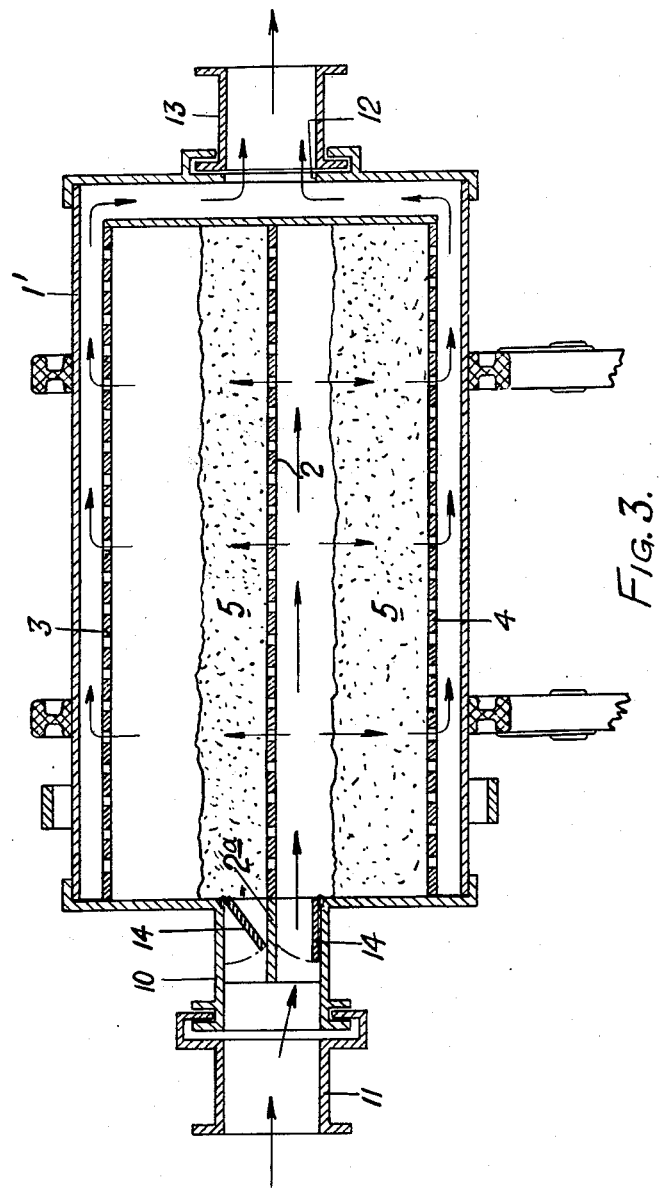

Feb. 8, 1955     I. M. STEWART ET AL     2,701,422
MALTING AND DRYING APPARATUS
Filed Sept. 22, 1953     2 Sheets-Sheet 1
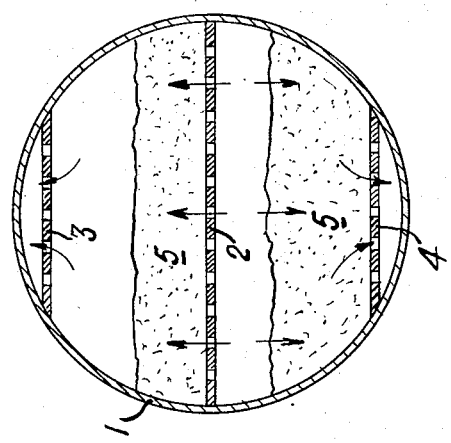
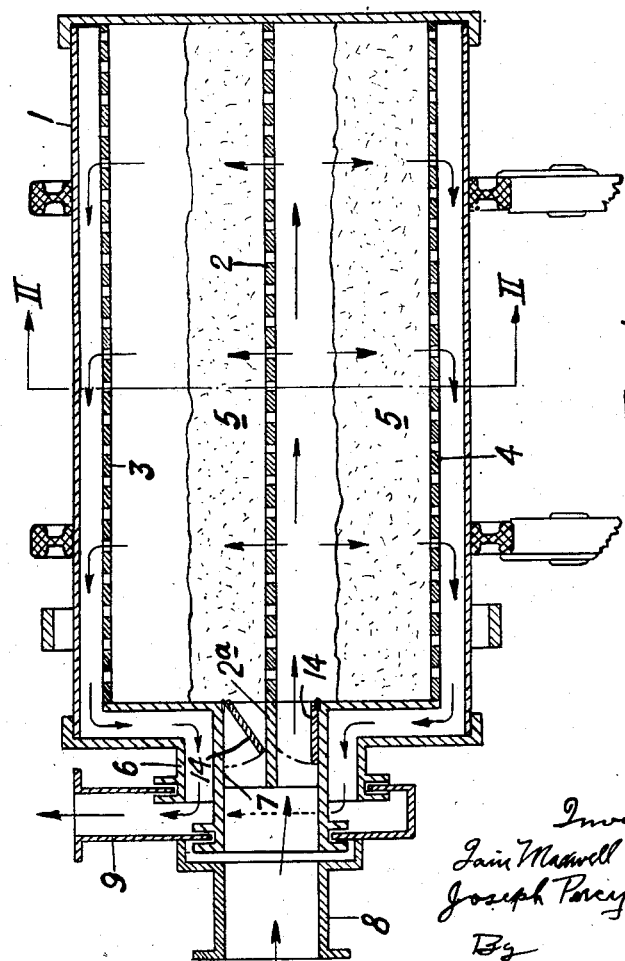

Feb. 8, 1955  I. M. STEWART ET AL  2,701,422
MALTING AND DRYING APPARATUS
Filed Sept. 22, 1953  2 Sheets-Sheet 2

United States Patent Office 2,701,422
Patented Feb. 8, 1955

2,701,422

MALTING AND DRYING APPARATUS

Iain Maxwell Stewart, Glasgow, Scotland, and Joseph Percy Wesson, Bury St. Edmunds, England, assignors of one-third to Robert Boby Limited, Suffolk, England, a corporation of Great Britain and Northern Ireland Application September 22, 1953, Serial No. 381,661

Claims priority, application Great Britain September 27, 1952

1 Claim. (Cl. 34—109)

This invention relates to improvements in malting and drying apparatus of the type including a rotatable substantially cylindrical drum which is connected with an air inlet and an air outlet, and in which grain is germinated and/or dried, a perforated grain floor extending lengthwise of the drum with an air space beneath said floor, and means for causing air to pass through the grain by setting up a pressure difference between the air inlet and the air outlet.

In a known construction of such an apparatus means is provided to ensure uniform distribution of conditioned air under pressure to the air space beneath the floor and to cause the air to pass through the grain to remove heat resulting from germination or to remove moisture from grain to be dried.

Such a construction has many advantages in that the grain has a more or less uniform depth over the perforated grain floor, but is open to the objection that, if the grain depth is to be kept within limits that will avoid excessive expenditure of fan power to overcome the resistance to air flow through the grain or to avoid a large temperature gradient between the grain on the floor and the working level of the grain, a considerable proportion of the drum capacity remains as a void above the grain.

It is an object of this invention to provide a construction which will have efficient malting and drying properties and will have increased effective malt or grain capacity.

In malting and drying apparatus of the type referred to, according to the invention, besides a main perforated floor two additional perforated grain floors extend lengthwise of the drum which is thus provided with three grain floors, namely, the main floor, which is disposed diametrally of the drum, and two auxiliary floors, which are disposed substantially parallel to and on opposite sides of the main floor and are spaced from the periphery of the drum to permit passage of air between said auxiliary floors and the periphery of the drum.

Two constructions of malting and drying apparatus of the type referred to, according to the invention, are illustrated in the accompanying drawings in which:

Fig. 1 is a sectional elevation of one construction.
Fig. 2 is a section on the line II—II of Fig. 1.
Fig. 3 is a sectional elevation of the other construction.

Referring to the drawings, 1 or 1' denotes a rotatable cylindrical drum in which grain is steeped, germinated and dried. 2 denotes a perforated grain floor disposed diametrally of the drum 1 or 1' with a substantially open space beneath said floor 2. Two auxiliary perforated grain floors 3, 4 extend lengthwise of the drum on opposite sides of and parallel to the diametral floor 2. The two spaces between the diametral floor 2 and the floors 3, 4 receive an appropriate quantity of grain 5 such that, when these floors 2, 3 and 4 are horizontal, the space between the working level of the grain 5 and the perforated floor immediately above will be adequate to permit a sufficient flow of air to maintain the grain bed in the required condition for germinating or for drying.

Referring to Figs. 1 and 2, one end of the drum 1 is formed with two cylindrical ducts 6, 7 co-axial with the drum 1. The outer duct 6 serves as an air outlet or as an air inlet and the inner duct 7 serves as an air inlet or as an air outlet. Air is introduced to or flows out of the inner duct 7 through a trunnion duct 8 co-axial with the drum 1. Air flows out of or is introduced to the outer duct 6 through a lateral duct 9 located at the same end of the drum 1 as the duct 8.

Referring to Fig. 3, one end of the drum 1' is formed with an external duct 10 co-axial with the drum 1' and in communication with a co-axial air inlet or air outlet trunnion duct 11. The other end of the drum 1' is formed with a port 12 in communication with an air outlet or an air inlet trunnion duct 13 co-axial with the drum 1'.

Referring to Figs. 1 and 3, the diametral floor 2 is formed with an extension 2ª located diametrally of the duct 7 (Fig. 1) or of the duct 10 (Fig. 3). The extension 2ª partitions a portion of the duct 7 (Fig. 1) or of the duct 10 (Fig. 3) into two passages each of which serves as an air inlet or as an air outlet only when the respective passage is below the diametral floor 2. Automatically operated valves 14 are so arranged in said passages that air is delivered or is discharged only to or from the air space below the diametral floor 2. Longitudinal plates or rods (not illustrated) may be incorporated in the grain space to promote the mixing of the grain.

In the constructions of apparatus illustrated, air is injected into the space between the diametral floor 2 and the surface of the grain bed below. The pressure of an operating fan or blower (not illustrated) propels this air upwards through the grain resting on the diametral floor 2 and downwards through the lower bed of grain resting on the lowermost floor 4. Air escapes through the floors 3, 4 above and below the diametral floor 2 into the segmental cavities between these upper and lower floors 3, 4 and the shell of the drum. Means (not illustrated) is arranged at one or other end of the drum to pass this air into the duct 9 (Fig. 1) or into the duct 13 (Fig. 3).

It will also be noted that on partial rotation of the drum through 180°, the lower grain bed will become the upper grain bed and the direction of air flows through the beds reversed, with consequential nearness to uniformity of temperature in the beds. What was the air space between the top of the bottom grain bed and the diametral floor 2 will now be filled with grain and the respective passage in the duct 7 (Fig. 1) or in the duct 10 (Fig. 3) for flow of air into said air space will be closed by the valve 14.

What is claimed is:

Malting and drying apparatus including a substantially cylindrical drum rotatable about a horizontal axis and having an air inlet and an air outlet, and having a main perforated plane floor extending lengthwise of said drum and disposed diametrally of said drum, two auxiliary perforated plane grain floors extending lengthwise of said drum and disposed substantially parallel to and on opposite sides of said diametral floor, the medians of said auxiliary floors being spaced from the periphery of said drum, said floors serving in turn to carry grain to be steeped, germinated and dried, and valve means at said air inlet adapted in each semi-rotation of said drum to change the point of inflow of air in relation to the faces of said diametral floor.

References Cited in the file of this patent

UNITED STATES PATENTS

| | | |
|---|---|---|
| 1,462,621 | Pfeiffer | July 24, 1923 |
| 1,596,977 | Klinger | Aug. 24, 1926 |
| 1,995,966 | Delemme | Mar. 26, 1935 |

FOREIGN PATENTS

| | | |
|---|---|---|
| 835 | Great Britain | 1899 |